May 31, 1932. B. BRAMWELL 1,861,295
FILTER
Filed Jan. 8, 1929 4 Sheets-Sheet 1
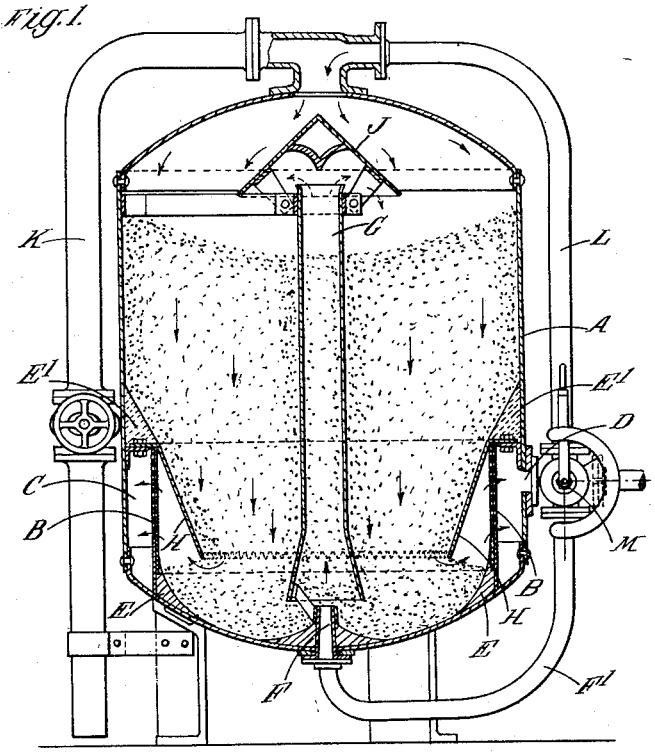
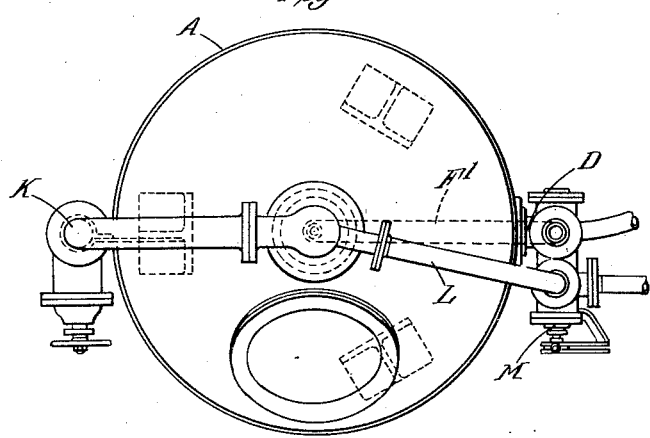
Inventor
Balfour Bramwell
By James L. Morris,
Attorney

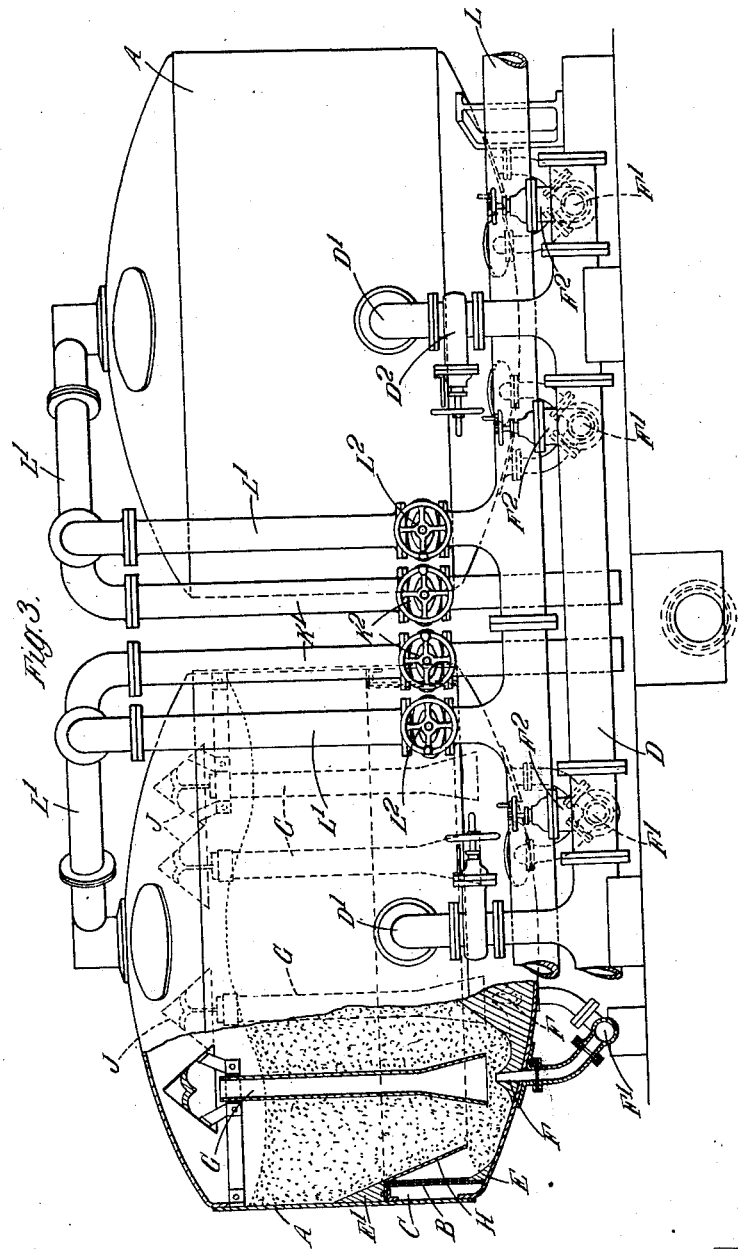

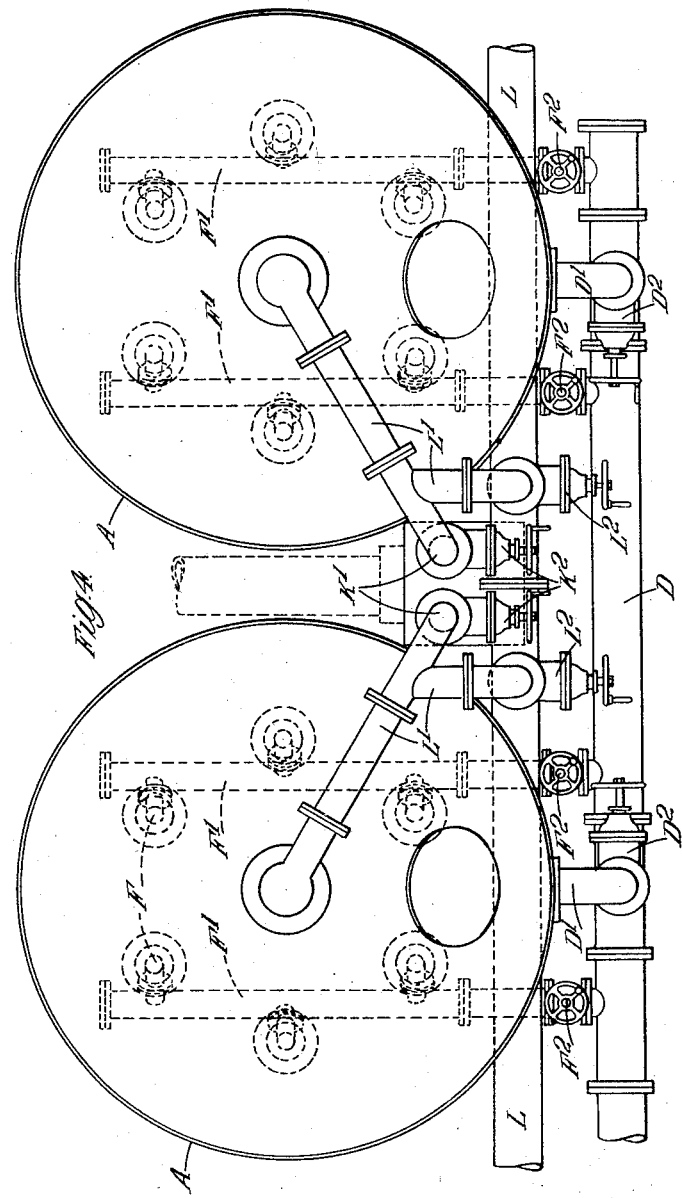

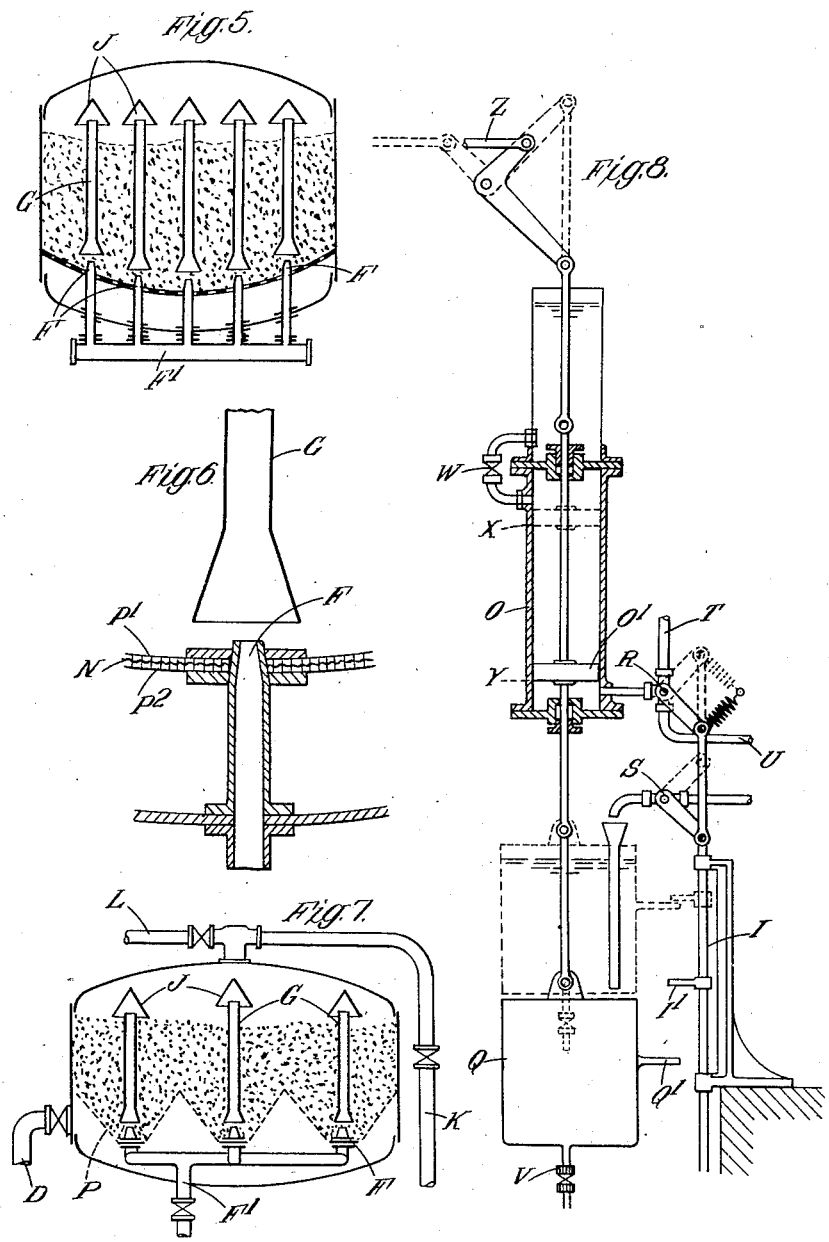

Patented May 31, 1932

1,861,295

UNITED STATES PATENT OFFICE

BALFOUR BRAMWELL, OF BELFAST, IRELAND

FILTER

Application filed January 8, 1929, Serial No. 331,133, and in Great Britain February 7, 1928.

This invention relates to filters in which the filtering medium is a mass of sand or equivalent material, and particularly to filters of large capacity intended to deal with large volumes of turbid water, and wherein frequent cleansing of the sand or other filtering medium is necessary.

The means adopted for cleansing the filtering medium comprises one or more water nozzles, each directed through the bottom of the filter bed chamber into an upwardly extending open-ended wash tube, whereby the sand particles resting on the bottom of the filter, are entrained and carried in a state of turmoil up through the tube in which they are completely scoured by the washing water, and the scoured sand or the like is redeposited on the filter bed of the chamber, while the washing water is run off to the drain or other receptacle.

According to the present invention filtering apparatus of the character hereinbefore described are provided with an annular collecting chamber formed near the lower end of the filter chamber, by a perforated inner wall or skirt extending to the bottom of the filter chamber, and also with a coned retaining or supporting wall extending downwardly from the upper end of the said skirt into the lower part of the filter chamber to a point above the bottom of said chamber, this coned wall serving as a support for the filtering material and a guide for it in its gradual descent during the washing process towards a centrally situated wash nozzle. This coned supporting wall also forms an additional collecting space for the filtered water around the outside of the perforated skirt.

The invention will be more specifically described with reference to the accompanying drawings, in which Fig. 1 is an elevation, partly in section of a filter embodying the present invention and having a single central wash tube, Fig. 2 being a plan of the same; Fig. 3 is an elevation, partly in section, of a battery of filters, two filter chambers being shown each with a multiple arrangement of nozzles and wash tubes, Fig. 4 being a plan view of the same; Fig. 5 is a diagrammatic vertical section of a filter chamber of a modified construction; Fig. 6 is a sectional view of a detail of same on an enlarged scale; Fig. 7 is a diagrammatic vertical section of a filter chamber of a further modified form, and Fig. 8 is an elevation partly in section of an apparatus designed to control automatically the cleansing process.

Referring first to Figs. 1 and 2, the filter chamber A is preferably, as shown, a cylindrical structure with substantially spherical ends. Inside the chamber at its lower end is a cylindrical skirt or partition B of perforated plates which cuts off the collecting chamber C from the main part of the filter chamber and which is connected through the wall of the filter chamber with an outlet or delivery pipe D for the filtrate, which is preferably controlled by a valve.

The angles of the space within the filter chamber below the perforated skirt B are rounded off with asphalt fillets E so as to ensure the gradual sliding, under the action of gravity and of induced stream lines, of the sand or other filtering material toward an injector nozzle F which projects upwardly through the bottom of the filter chamber and delivers into the flared end of a central vertical wash tube G. Similarly the angular space around the interior of the filter chamber above the top of the perforated skirt B is filled in with asphalt or with a fillet of other suitable material, as indicated at E'. The surface of this fillet is substantially conical and said surface is continued downwardly by a coned retaining or supporting wall H which extends downwardly into the lower part of the filter chamber within the cylindrical perforated skirt B, the free space between this coned retaining wall and the perforated skirt forming an additional collecting space for the filtered water. The injector nozzle F is connected by pipe F' through a valve with the clean water delivery pipe D and delivers into the flared lower end of the wash tube G, which is rigidly fixed in a central vertical position above the nozzle F, and, at its upper end, which is also open, is capped by a coned deflector J, the function of which is to deflect the washed sand ejected from the upper end of the wash tube downwardly on to the surface of the filter bed, while the soiled water passes by pipe K to a drain or other receptacle. The water to be filtered passes through a control valve to inlet pipe L which delivers it to the filter chamber through an opening in the top of the latter situated immediately above the coned deflector J.

The various inlet and discharge pipes above referred to are preferably controlled by means of a common rotary valve device, indicated at M, which in one position admits the turbid water to be filtered through the pipe L to the upper end of the filter chamber and simultaneously connects the filtrate collecting chamber C with the clean water delivery pipe D. In another position of the valve the inlet pipe L is closed, while clean water is admitted to the pipe F' which leads to the injector wash nozzle F. In a third position of the valve clean water is admitted through pipe D to the chamber C and flows in a reverse direction up through the material of the filter bed and is discharged through pipe K to the drain. In this latter position the inlet pipe L to the filter chamber is closed by the valve.

It will be seen that, by reason of the provision of the coned retaining wall H and the downward slope towards the injector nozzle F of the bottom of the filter chamber, the gravitation of all the particles of sand in turn in the filter bed down to the region in which the action of the injector nozzle becomes effective on these particles is ensured, and consequently all the sand in turn during the washing operation will be forced upwardly through the wash tube G and agitated and scoured, during its ascent through this tube, by the clean water jet emitted from the nozzle F.

In the multiple chamber battery illustrated in Figs. 3 and 4 the same reference characters as in Figs. 1 and 2 are used for corresponding parts of the apparatus. In this case, however, the various inlet and discharge pipes are controlled by separate valves. Thus, the several branches L' leading from the common inlet pipe L to the upper ends of the filter chambers are controlled by independent valves L², and similarly the branch outlet pipes D' leading from the collector chambers C to the common delivery pipe D are controlled by separate valves D², and the branch pipes F' leading from the common clean water delivery pipe D to the injector wash nozzles F have separate control valves F². Similarly, the branch pipes K' for carrying off the dirty water during the washing process from the top of the filter bed to the drain are provided with separate control valves K².

The injector nozzles F are distributed over the bottom of each filter chamber so as to give each nozzle a substantially equal area for its operation and, as shown in Fig. 4, they are arranged at equal distances apart in a circle of suitable diameter, three of these nozzles being fed from one of the branch pipes F' and three from the second branch pipe F'.

The bottom of each filter chamber is contoured, as by means of fillets E of asphalt or the like, to facilitate the gravitational feed of the sand particles to the several nozzles over the area under their influence, and with the same object any angular spaces within the filter chamber are filled in in a similar manner, as indicated at E'.

Figure 5 illustrates how the invention may be applied to existing sand filters of an ordinary type. In this case the supporting floor for the filtering material is made of two perforated plates P', P² (Fig. 6) with an interposed sheet of gauze N, these plates being substantially spherical, so that the sand or other filtering material will be inclined to gravitate from around the edges of the filter bed towards the centre of the supporting floor. This brings the sand, during the washing process, within the region of action of one or other of the injector nozzles F which are supplied with clean wash water from a common supply pipe F'. Each of these nozzles, as in the other embodiments of the invention, delivers into the lower flared end of a separate wash tube G surmounted by a deflector cap J.

In the modified construction of Fig. 7 the perforated supporting floor P is formed so as to provide a coned floor for the superincumbent filtering material around each of the injector wash nozzles F and wash tubes G, and the filtrate collects in and is drawn off from the space below this perforated supporting floor.

The rotary valve device M (Fig. 1) may be automatically actuated to control the periods of filtration and cleansing by any suitable mechanism, mechanical or electrical, and one convenient arrangement for doing so is illustrated more or less diagrammatically in Fig. 8. As shown in this drawing Z is a rod by means of which the rotary valve is actuated by the movement of a piston O' in a cylinder O with which the rod Z is connected through suitable linkage. The lower end of the cylinder O is connected alternately with a pressure pipe T, leading to the filter chamber, and a discharge pipe U, a two-way cock R serving to effect the change of connection. This two-way cock R is actuated by the guided longitudinal movement of a rod I which in turn is actuated through tappets I' by a cooperating tappet Q' on a bucket Q suspended from the piston O'. The resistance to the movement of the piston O' is controlled by means of a regulating cock W in a by-pass connecting the upper end of the cylinder O with an open water tank above it.

When the pressure in the filter chamber rises to a predetermined value due to the filter bed becoming choked with impurities such pressure is transmitted to the lower end of the cylinder O through the pipe T and the piston O' is shifted from the position marked Y to that marked X, a water supply cock S being simultaneously opened by the upward movement of the tappet rod I to deliver water into the bucket Q, and the two-way cock R being simultaneously turned to close the pressure pipe T and open the exhaust pipe U. When the bucket Q is filled, and the time taken to do so is adjusted to the time required to clean the filter bed completely, the piston descends again from position X to position Y, and the cocks R and S are returned to their initial positions. A cock V is provided in the bottom of the bucket Q to drain the latter.

In the various embodiments of the invention hereinbefore described it is usually preferred that, as shown for example in the construction of Figs. 3 and 4, there be a reverse flow of clean water from the collecting chamber C upwardly through the material of the filter bed during the time that the injector wash nozzles are in operation, so as to prevent any dirt settling in the filter bed with the washed sand.

Moreover, the feeding of the filtering material towards the injector wash nozzle or nozzles may be assisted by auxiliary jets suitably directed and preferably controlled by separate valves. For example, a series of nozzles may be provided projecting inwardly through the perforated partition B and discharging in a downwardly inclined direction so as to cause the sand in their neighbourhood to flow towards the injector wash nozzles F.

Having thus described the nature of the said invention, and the best means I know of carrying the same into practical effect, I claim:—

1. A filtering apparatus, comprising a filter chamber to contain a filtering medium, a perforate wall in the lower end of said chamber connected to but spaced from the wall of said chamber and forming with the latter wall a collecting chamber for filtered water, a filtering-medium retaining wall within said perforate wall and extending obliquely downwardly from the latter with its lower end spaced from the floor of said chamber, said retaining wall forming with said perforate wall a supplemental collecting chamber for filtered water, a plurality of water wash nozzles extending upwardly from the bottom of said chamber within the area defined by the lower end of said retaining wall, and a plurality of wash tubes depending into said chamber, each of said wash tubes having its lower end outwardly flared and disposed over one of said wash nozzles, the portions of the floor of said chamber surrounding the water wash nozzles being shaped to facilitate the gravitational feeding of the filtering medium toward said nozzles.

2. A filtering apparatus comprising a filter chamber to contain a filtering medium and having at its lower end a double wall enclosing an annular collecting chamber, the inner wall or skirt of said chamber being perforated for the passage of water, a plurality of injector wash nozzles and open-ended vertical wash tubes within the filter chamber and valvular means adapted to connect the said annular collecting chamber and the said injector wash nozzles simultaneously with a clean water supply.

3. A filtering apparatus, comprising a filter chamber to contain a filtering medium and having at its lower end a double wall enclosing an annular collecting chamber, the inner wall or skirt of said chamber being perforated for the passage of water, an injector wash nozzle in the bottom of the filter chamber, an open-ended wash tube within the filter chamber extending vertically above the said wash nozzle, and a filtering medium retaining wall within the perforated inner wall or skirt of the collecting chamber and extending obliquely downward from the latter toward the injector wash nozzle.

In testimony whereof I have signed my name to this specification.

BALFOUR BRAMWELL.